(12) United States Patent
Nishitani

(10) Patent No.: US 7,792,412 B2
(45) Date of Patent: Sep. 7, 2010

(54) MULTI-SCREEN IMAGE REPRODUCING APPARATUS AND IMAGE REPRODUCING METHOD IN MULTI-SCREEN IMAGE REPRODUCING APPARATUS

(75) Inventor: Masanobu Nishitani, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 911 days.

(21) Appl. No.: 11/084,832

(22) Filed: Mar. 21, 2005

(65) Prior Publication Data

US 2005/0207728 A1 Sep. 22, 2005

(30) Foreign Application Priority Data

Mar. 22, 2004 (JP) .............................. 2004-082720

(51) Int. Cl.
G09G 5/12 (2006.01)
H04N 5/91 (2006.01)
H04N 1/387 (2006.01)

(52) U.S. Cl. .............................. 386/66; 386/46; 386/95; 386/124; 358/450; 358/451; 345/1.1; 725/145

(58) Field of Classification Search ................. 725/112, 725/113, 135, 136, 8, 9, 144, 145; 386/46, 386/61, 66, 95, 124; 348/460, 461, 383, 348/588, 721, 739, 51, 52, 512, 584, 585; 358/450, 451; 345/1.1; 709/203, 217–219, 709/224, 248, 249

See application file for complete search history.

(56) References Cited

U.S. PATENT DOCUMENTS

| | | | | |
|---|---|---|---|---|
| 4,805,036 | A | * | 2/1989 | Kido et al. ..................... 386/66 |
| 4,991,121 | A | * | 2/1991 | Minoura et al. .............. 345/1.1 |
| 5,523,769 | A | | 6/1996 | Lauer et al. |
| 5,822,002 | A | * | 10/1998 | Tokoro et al. ............... 348/383 |
| 6,247,090 | B1 | | 6/2001 | Arai et al. |
| 6,583,771 | B1 | | 6/2003 | Furuhashi et al. |
| 6,611,241 | B1 | | 8/2003 | Firester et al. |
| 6,778,168 | B2 | | 8/2004 | Mamiya et al. |

(Continued)

FOREIGN PATENT DOCUMENTS

JP A-07-248750 9/1995

(Continued)

Primary Examiner—Thai Tran
Assistant Examiner—Mishawn Dunn
(74) Attorney, Agent, or Firm—Oliff & Berridge, PLC

(57) ABSTRACT

To provide a multi-screen video playback apparatus outputting video data to a plurality of display units constituting a multi-screen display, respectively, and capable of reliably and efficiently delivering the video data and playback control information required for reproducing the video data. There is provided a multi-screen video playback apparatus including: a plurality of rendering units RU1 to RU4 which is connected to a network and outputs video data to the corresponding display units among a plurality of display units; and an video delivery server VS as video-data and playback-control-information delivery device, which is connected to the network and has a function of delivering the video data to the plurality of rendering units and a function of delivering to the plurality of rendering units playback control information making the plurality of rendering units output the video data to the corresponding display units. The network includes a video network to deliver the video data and a playback-control-information network to deliver the playback control information.

9 Claims, 13 Drawing Sheets

U.S. PATENT DOCUMENTS

| | | | |
|---|---|---|---|
| 6,900,844 B2 * | 5/2005 | Itaki et al. | 348/383 |
| 6,985,589 B2 * | 1/2006 | Morley et al. | 380/269 |
| 7,250,978 B2 * | 7/2007 | Lee et al. | 348/383 |
| 2002/0046241 A1 * | 4/2002 | Nomura et al. | 709/203 |
| 2003/0097478 A1 * | 5/2003 | King | 709/248 |
| 2003/0117429 A1 * | 6/2003 | Korehisa et al. | 345/716 |
| 2004/0107449 A1 * | 6/2004 | Fukuda et al. | 725/135 |
| 2006/0116187 A1 * | 6/2006 | Johnson et al. | 463/16 |
| 2006/0145941 A1 * | 7/2006 | Park et al. | 345/1.1 |

FOREIGN PATENT DOCUMENTS

| | | |
|---|---|---|
| JP | A 9-6297 | 1/1997 |
| JP | A 10-13778 | 1/1998 |
| JP | A-10-260665 | 9/1998 |
| JP | A-2000-330502 | 11/2000 |
| JP | A-2001-228841 | 8/2001 |
| JP | A 2001-242435 | 9/2001 |

* cited by examiner

MULTI-SCREEN IMAGE REPRODUCING APPARATUS AND IMAGE REPRODUCING METHOD IN MULTI-SCREEN IMAGE REPRODUCING APPARATUS

BACKGROUND

Exemplary aspects of the present invention relate to a multi-screen video playback apparatus which can be suitably used as a video playback apparatus in a multi-screen display, etc. and a video playback method in the multi-screen video playback apparatus.

FIG. 13 is a schematic illustrating a related art multi-screen display. As shown in FIG. 13, the multi-screen display D is a display which can constitute a large-sized screen by combining a plurality of display units D1 to D4, such as monitors or projectors. A multi-screen video playback apparatus is a video playback apparatus to output video signals to be input to the respective display units D1 to D4 constituting the multi-screen display D.

In such a related art multi-screen video playback apparatus, conventionally, a large-sized display is realized by converting a video signal corresponding to a large-sized screen (a video signal corresponding to an original video) into respective video signals corresponding to the respective display units D1 to D4 (respective video signals corresponding to respective unit videos) using a scan converter and inputting the respective video signals to the respective display units D1 to D4.

With recent digitalization of video signals, there is a need to deal with the video signals in the format of digital signals in such multi-screen video playback apparatus. Specifically, a method of dividing video signals into digital signals corresponding to respective display devices, delivering or storing the divided video signals, and inputting the video signals to the respective display devices is widely used.

However, generally, most of the display devices used to play back multi-screen videos, including related art analog methods, receive video data from personal computers (hereinafter, PC) as a video supplier and playback control information to play back the video data through one input interface.

As the playback control information, a variety of information, such as display timing information as a synchronization signal to play back videos in synchronism with the display devices, irregular playback control information to enable an irregular playback, such as a variable-speed playback of a low-speed playback and a high-speed playback, etc. can be considered. It is also required that the synchronization playback or the irregular playback by a plurality of display devices is realized by delivering such playback control information to each display device through a network from one PC.

However, in order to more reliably deliver and receive video data having high definition without deterioration in quality, a high-speed and large-capacity network dedicated to the video data may be used.

Therefore, it is not preferable that video data and information (for example, the playback control information described above) except for the video data are treated through the same network. This is intended to reduce the likelihood or prevent problems in that an excessive load is applied to the network, that bandwidth of the video data are restricted, and that the synchronization is not accomplished due to unsure delivery of synchronous playback information to play back the video data in synchronism with all the display devices.

An example where video data and information except for the video data are transmitted through different communication lines is disclosed in Japanese Unexamined Patent Application Publication No. 2001-242435. Japanese Unexamined Patent Application Publication No. 2001-242435 discloses a structure that a communication-control transmission line, that is different from the video-data transmission line, is provided between a PC and a plurality of display devices.

SUMMARY

A structure that the video-data transmission line and the communication-control transmission line are separately provided is disclosed in Japanese Unexamined Patent Application Publication No. 2001-242435. The communication information of Japanese Unexamined Patent Application Publication No. 2001-242435 is only information for making it possible to control vertical and horizontal movement of display positions of the display devices. Therefore, Japanese Unexamined Patent Application Publication No. 2001-242435 does not disclose that display timing information to obtain synchronization in the respective display devices or control information to allow the irregular playback, such as a high-speed playback and a low-speed playback, is transmitted through a network different from the network to transmit the video data.

Therefore, exemplary aspects of the present invention provide a multi-screen video playback apparatus capable of delivering high-quality video data and reliably performing playback control of the video data on display devices by transmitting the video data and playback control information to control playback of the video data through different networks, and an video playback method in the multi-screen video playback apparatus.

Means for Solving the Problems (1) According to an exemplary aspect of the present invention, there is provided a multi-screen video playback apparatus to output video data to a plurality of display units constituting a multi-screen display, respectively. The multi-screen video playback apparatus includes: a network; a plurality of rendering units which are connected to the network and output video data to the corresponding display units among the plurality of display units; and a video-data and playback-control-information delivery device which is connected to the network and has a function of delivering the video data to the plurality of rendering units and a function of delivering to the plurality of rendering units playback control information making the plurality of rendering units output the video data to the corresponding display units. The network includes a video network to deliver the video data and a playback-control-information network to deliver the playback control information.

In this way, since the video data are delivered through the video network and the playback control information is delivered through the playback-control-information network, the video data and the playback control information can be delivered to the rendering units through different dedicated networks. As a result, since the video data can be delivered using the bandwidth of the network in maximum, it is possible to deliver the video data without deterioration in quality. Since the playback control information can be delivered using the dedicated network, it is possible to reliably deliver the playback control information to the rendering units.

(2) In the multi-screen video playback apparatus according to (1), the playback-control-information network may enable two-way communication between the video-data and a playback-control-information delivery device and the rendering units.

In this way, by using a network enabling the two-way communication as the playback-control-information network, the video-data and playback-control-information delivery device and the rendering units can communicate with mutual cooperation, thereby more reliably controlling the playback. For example, when there occurs a situation where the processes by the rendering units is not performed, such a situation can be communicated to the video-data and playback-control-information delivery device, thereby always performing the playback control under a proper condition. By performing such playback control, it is possible to properly and reliably deliver the video data and to properly output the delivered video data to the display units from the rendering units.

(3) In the multi-screen video playback apparatus according to (1) or (2), the video-data and playback-control-information delivery device may include a playback-control-information delivery server which can generate and deliver the playback control information and an video delivery server which can generate video data to be supplied to the rendering units and deliver the video data to the rendering units.

In this way, by dividing the video-data and playback-control-information delivery device into the playback-control-information delivery server and the video delivery server, it is possible to efficiently perform the respective functions.

(4) In the multi-screen video playback apparatus according to (3), the playback-control-information network may enable at least connection between the playback-control-information delivery server and the video delivery server and between the playback-control-information delivery server and the rendering units.

Accordingly, even when the video-data and playback-control-information delivery device is separately divided into the playback-control-information delivery server and the video delivery server, it is possible to reliably deliver the playback control information from the playback-control-information delivery server to the respective rendering units through the playback-control-information network. In addition, it is possible to reliably deliver the control information on the video delivery to the video delivery server as the playback control information to the video delivery server from the playback-control-information delivery server.

The control information on the video delivery to the video delivery server from the playback-control-information delivery server includes irregular playback instructions, such as an instruction to extract and play back frames of video data (frame-advance playback instruction and an instruction to output frames in the order of frame numbers opposite to the forward order (reverse playback instruction), etc. Even when such irregular playback instructions are delivered as the playback control information to the video delivery server, the delivery can be performed through the playback-control-information network, thereby reliably performing the playback control.

(5) In the multi-screen video playback apparatus according to (4), the playback-control-information network may enable at least two-way communication between the playback-control-information delivery server and the video delivery server and between the playback-control-information delivery server and the rendering units.

As a result, since the delivery of the playback control information can be performed between the playback-control-information delivery server and the video delivery server and between the playback-control-information delivery server and the rendering units with mutual cooperation, it is possible to properly and reliably perform the playback control.

(6) In the multi-screen video playback apparatus according to any one of (1) to (5), the playback control information may include display timing information to make the rendering units synchronize and output the video data to the corresponding display units.

The display timing information is a synchronization signal allowing the plurality of display units to display synchronized videos. By delivering the display timing information as the playback control information to the respective rendering units through the dedicated network (the playback-control-information network), it is possible to reliably deliver the display timing information to the respective rendering units. As a result, the video display properly synchronized can be performed by the respective display units.

By changing the delivery cycle of the display timing information, the rendering units can change the output timing of the video data to the corresponding display units, so that the irregular playback, such as high-speed playback and low-speed playback, can be performed.

(7) In the multi-screen video playback apparatus according to any one of (1) to (6), the video network may be a large-capacity and high-speed network and the playback-control-information network may be a small-capacity and low-speed network compared with the video network.

As a result, it is possible to deliver the video data having a large quantity of data without deterioration in quality. Since the playback control information is smaller in data quantity than the video data, it is possible to use a more inexpensive network.

(8) According to another exemplary aspect of the present invention, there is provided a video playback method in a multi-screen video playback apparatus to output video data to a plurality of display units, respectively. The multi-screen video playback apparatus includes: a network; a plurality of rendering units which are connected to the network and output video data to the corresponding display units among the plurality of display units; and a video-data and playback-control-information delivery device which is connected to the network and has a function of delivering the video data to the plurality of rendering units and a function of delivering to the plurality of rendering units playback control information making the plurality of rendering units output the video data to the corresponding display units. The network includes a video network to deliver the video data and a playback-control-information network to deliver the playback control information. The video data are delivered through the video network and the playback control information is delivered through the playback-control-information network.

In the video playback method of the multi-screen video playback apparatus, it is possible to obtain the same advantages as those of the multi-screen video playback apparatus according to (1). The video playback method of the multi-screen video playback apparatus according to (8) may have the same features as those of the multi-screen video playback apparatus according to (2) to (7).

DETAILED DESCRIPTION OF EXEMPLARY EMBODIMENTS

First Exemplary Embodiment

Figure 1:
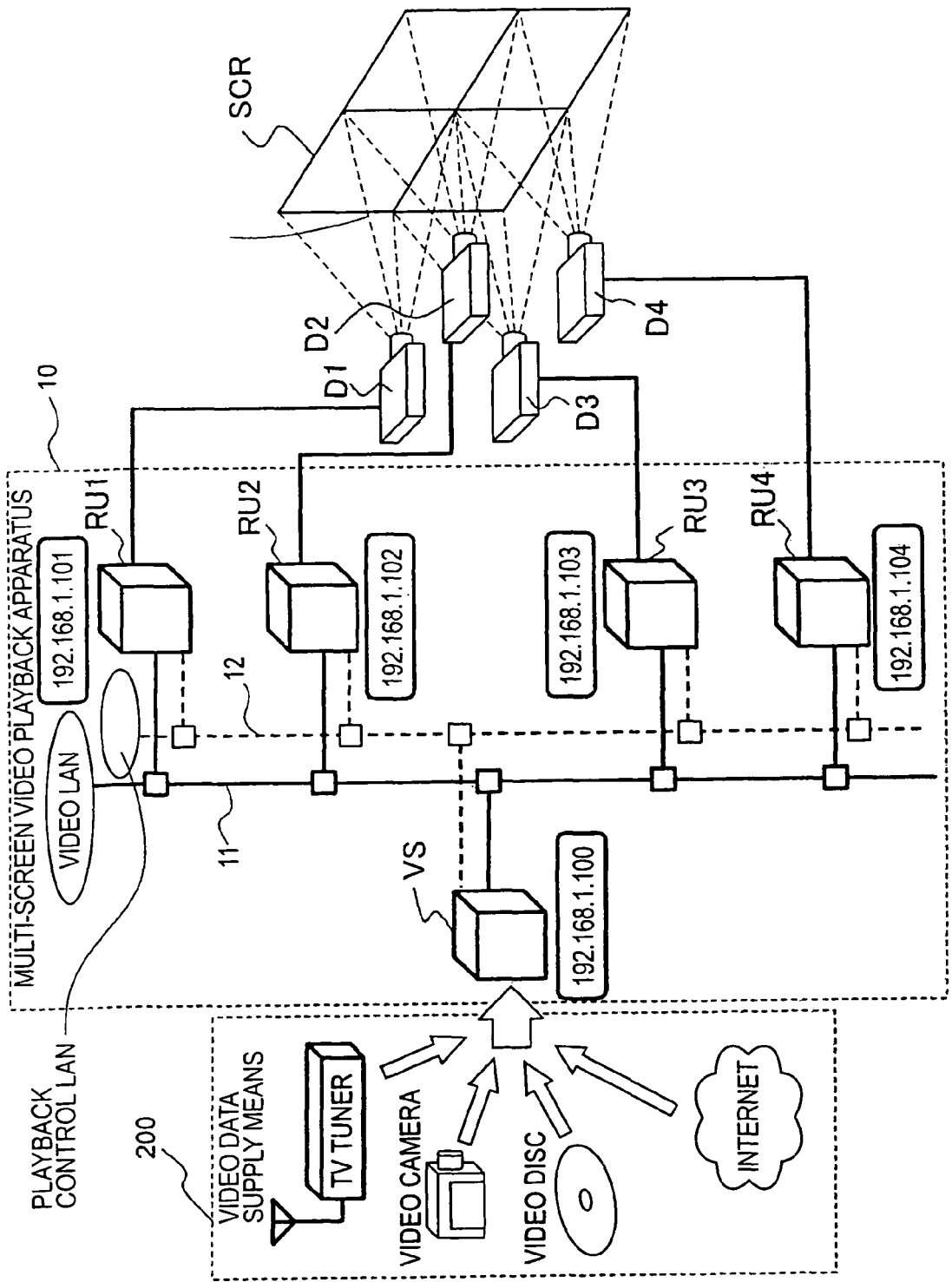
FIG. 1 is a schematic illustrating a structure of a multi-screen video playback apparatus according to a first exemplary embodiment.
Figure 2:
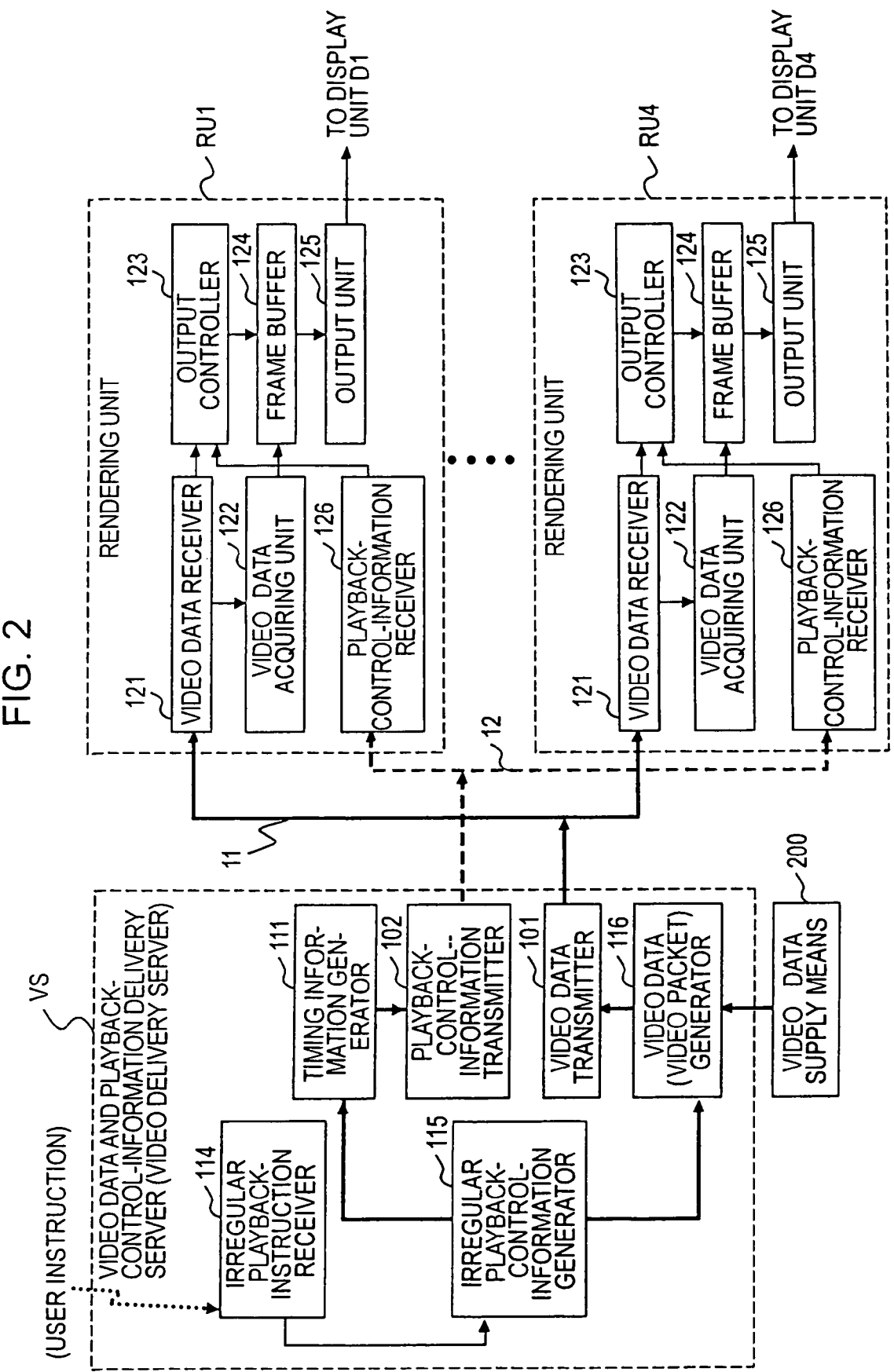
FIG. 2 is a schematic illustrating structures of a video-data and playback-control-information delivery device (video delivery server) and rendering units in the multi-screen video playback apparatus according to the first exemplary embodiment.

FIGS. 1 and 2 illustrate a multi-screen video playback apparatus according to a first exemplary embodiment of the present invention. As shown in FIG. 1, the multi-screen video playback apparatus according to the first exemplary embodiment of the present invention is an video playback apparatus to output synchronized video data to a plurality of display units D1 to D4 which constitute a multi-screen video display, where it is assumed that the display unit according to an exemplary aspect of the present invention is a projector of the front projection method.

It is also assumed that a multi-screen video display to project the synchronized video data output by the multi-screen video playback apparatus 10 includes four display units D1 to D4 arranged in a 2×2 matrix shape of two rows and two columns (2×2), and one big video is played back by integrating unit videos (i.e., partial videos) projected by each of the display units D1 to D4 onto a screen SCR.

As shown in FIGS. 1 and 2, the multi-screen video playback apparatus 10 according to the first exemplary embodiment has two networks. One of the two networks is a video network 11 (hereinafter, video LAN 11) to deliver video data, and the other one is a playback control network 12 (hereinafter, playback control LAN 12) to deliver playback control information. Further, the multi-screen video playback apparatus 10 includes a video-data and playback-control-information delivery server (referred to as a video delivery server VS in the first exemplary embodiment) connected to each of the video LAN 11 and the playback control LAN 12 through a network interface (not shown) and a plurality of rendering units RU1 to RU4 connected to each of the video LAN 11 and the playback control LAN 12 through a network interface (not shown).

The video LAN 11 may adopt a network capable of implementing a high quality and high speed communication, such as 100Base, 1000Base, an optical communication network. The playback control LAN 12 is allowed to adopt a relatively low-speed network, such as a 10Base, a wireless LAN, and an RS-232C. Further, a high-speed network, such as IEEE 1394, that is used in an AV apparatus or home appliances may be used.

The video delivery server VS or the rendering units RU1 to RU4 can be prepared by using a PC having a network interface as well as a dedicated apparatus.

Further, the video delivery server VS used in the multi-screen video playback apparatus 10 has a function of packetizing the video data supplied from a video data supply device 200, such as a TV tuner, a video disc, Internet, etc., and delivering them by a point-to-multipoint communication, such as a broadcast, to all rendering units RU1 to RU4, and a function of delivering to a plurality of rendering units RU1 to RU4 the playback control information which is necessary when the plurality of rendering units RU1 to RU4 outputs the video data to the corresponding display units D1 to D4.

Further, instead of the broadcast, a multicast may be adopted as a point-to-multipoint communication. But herein, it is assumed that the broadcast is used. In addition, the video data may be delivered to each of the rendering units not by the point-to-multipoint communication, but instead a unicast.

According to the first exemplary embodiment, the video delivery server VS includes a timing information generator 111 which generates display timing information to enable a synchronized display in a plurality of display units D1 to D4 as a display instruction packet, a video data generator (also referred to as a video packet generator) which generates video data as a video packet, a video data transmitter 101 which transmits the video packet generated in the video packet generator 116 to the video LAN 11, a playback-control-information transmitter 102 which transmits the playback control information (here, referred to as a display instruction packet for each of the rendering units RU1 to RU4) generated in the timing information generator 111 to the playback control LAN 12, an irregular playback-instruction receiver 114 which receives an irregular playback instruction issued from a user, and an irregular playback-control-information generator 115 which allocates the irregular playback control information to one of the timing information generator 111 and the video packet generator 116 or both of them based on the irregular playback instruction issued from a user and received by the irregular playback-instruction receiver 114.

According to each exemplary embodiment of the present invention, it is assumed that a TCP/IP is used as a network protocol for the video LAN 11 and the playback control LAN 12 in the video-data and playback-control-information delivery server (the video delivery server VS in the first exemplary embodiment). Further, an IP version number 4, i.e., IPv4, is used.

Also, a network topology may be used in the video LAN 11 and the playback control LAN 12 is a closed network type. A connection type has no significant difference in the number of layers used to access between the video-data and playback-control-delivery device (referred to as a video delivery server VS in the first exemplary embodiment) and each of the rendering units RU1 to RU4. This is because the probability of mismatch of the receiving timings of the display instruction packets by a point-to-multipoint communication (here, a broadcast) becomes high among each of the rendering units RU1 to RU4 when there is a significant difference in the number of layers.

Since the video LAN 11 and the playback control LAN 12 is assumed to be a small-sized closed network, delays or losses of the data packets streaming through the video LAN 11 and the playback control LAN 12 are unlikely.

Each rendering unit RU1 to RU4 includes a video data receiver 121 which receives video packets delivered by the video LAN 11, a video data acquiring unit 122 which acquires the video data stored in the video packets received by the video data receiver 121 and analyzes the acquired video data, a frame buffer 124 in which the video data stored in the video packets acquired by the video data acquiring unit 122 is expanded, a playback-control-information receiver 126 which receives the playback control information (the display instruction packet in this exemplary embodiment) delivered by the playback control LAN 12, an output controller 123 which controls the output of the video data expanded in the frame buffer 124 based on the display instruction packet received in the playback-control-information receiver 126, and an output unit 125 which outputs the video data to be output to a corresponding display unit (one of the display units D1 to D4). Further, each output unit 125 of each rendering unit RU1 to RU4 is connected with a corresponding display unit (one of the display units D1 to D4).

Each frame buffer 124 of each rendering unit RU1 to RU4 is a storage area to expand the video data stored in the video packets transmitted from the video delivery server VS, and the storage area may be obtained from a RAM or a video memory of the video card in a personal computer.

The frame buffer 124 includes two frame buffers, specifically, a frame buffer (a display frame buffer) to expand the video data which is being displayed and another frame buffer (a look-ahead frame buffer) to reserve the video data to be subsequently displayed, and thus implements a double buffering in which the look-ahead frame buffer and the display frame buffer are alternately used. Further, one or more look-ahead frame buffers may be used.

"Expanding" the video data in the frame buffer 124 means not only just storing the video data in the frame buffer 124 but also decoding or decrypting the encoded or encrypted video data to store them in the frame buffer 124.

Now, operations according to the first exemplary embodiment will be described. First, operations in a normal playback mode will be described. The normal playback mode according to an exemplary aspect of the present invention means a forward playback of the video data with an original frame rate.

First, the video data to be displayed are input from the video data supply means 200 to the video delivery server VS. Through this operation, the video deliver server VS generates the video packets by the video packet generator 116, and delivers the video packets from the video data transmitter 101 to each of the rendering units RU1 to RU4.

The same video data may be delivered from the video deliver server VS to all of the rendering units RU1 to RU4 by a point-to-multipoint communication, such as a broadcast (also, including a multicast). However, in this exemplary embodiment, a case that the video data to be delivered to each rendering unit RU1 to RU4 are separately delivered to each rendering unit RU1 to RU4 will be described.

Figure 13:
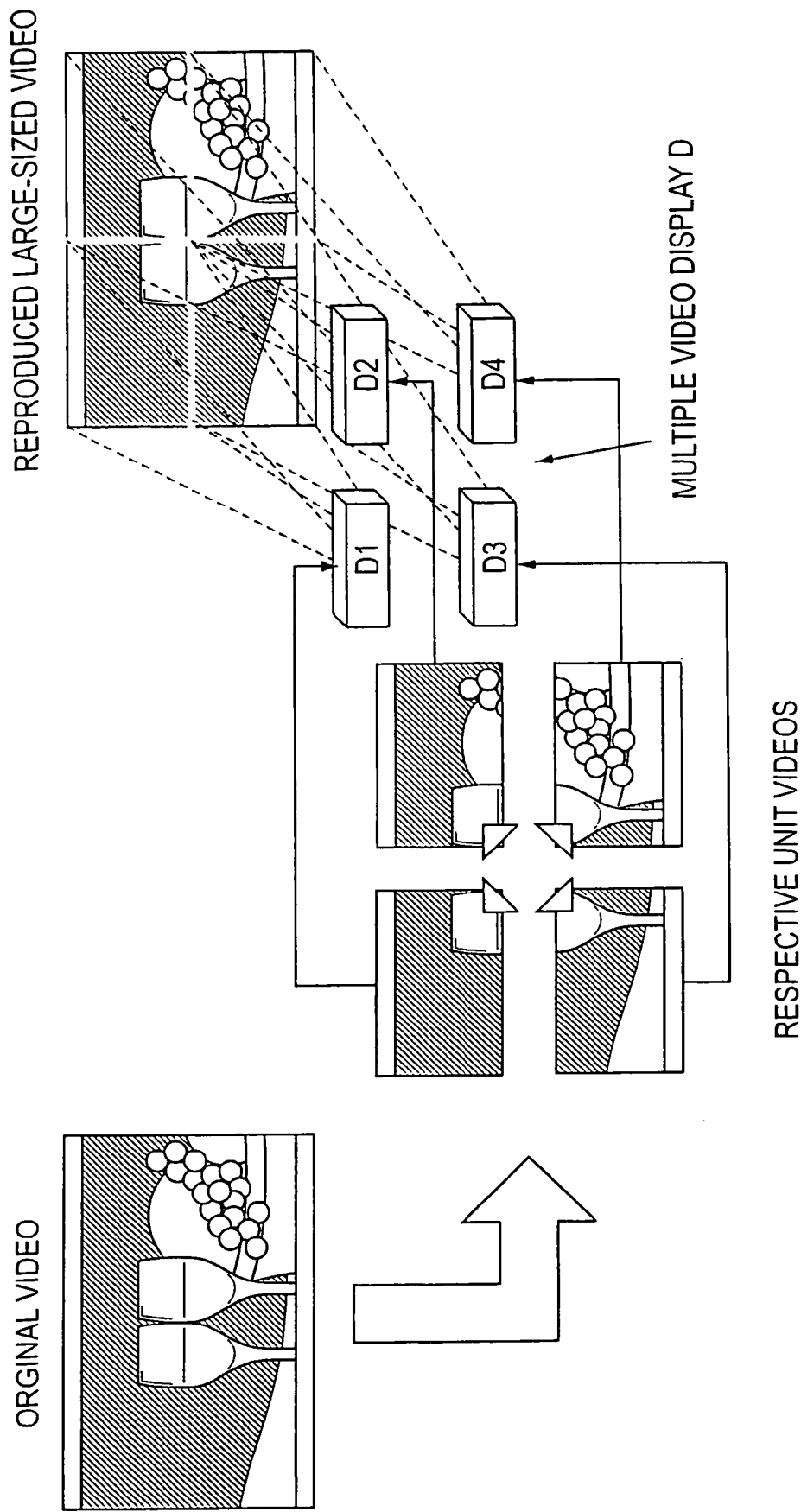
FIG. 13 is a schematic illustrating a related art multi-screen display.

According to a tiling display type in which four display units D1 to D4, constituting a 2×2 multi-screen video display, display their own partial videos, respectively, to constitute a large-sized screen obtained by integrating the partial videos as shown in FIG. 13, since each rendering unit RU1 to RU4 outputs partial videos corresponding to their own responsible areas with respect to the corresponding display units D1 to D4, the partial video data for each area corresponding to each rendering unit RU1 to RU4 are separately delivered.

Figure 3:
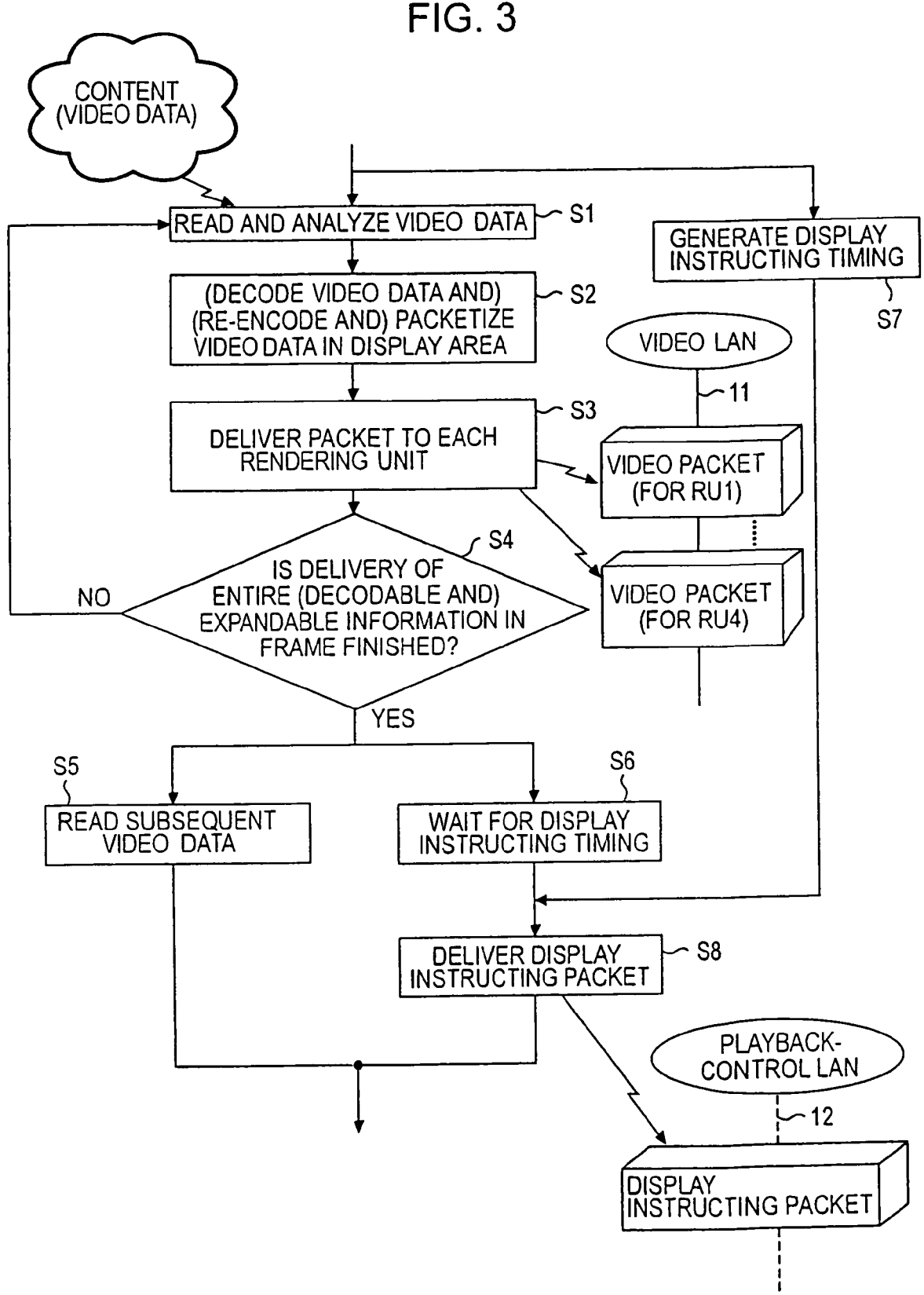
FIG. 3 is a flowchart illustrating operation of the video-data and playback-control-information delivery device (video delivery server) shown in FIG. 2.

FIG. 3 is a flowchart illustrating a process sequence in a video delivery server VS according to the first exemplary embodiment of the present invention. First, the contents from the video data supply device 200 are read and analyzed (step S1), and the read and analyzed video data are packetized for each display area corresponding to each rendering unit RU1 to RU4 (step S2).

Further, the step S2 may include an encryption/re-encoding process in which the video data read and analyzed in the step S1 are decrypted and divided into each display area corresponding to each rendering unit RU1 to RU4, and the video data for each divided display area are re-encoded and packetized, or a process of reducing the size of the read and analyzed video data below a maximum transmission unit (MTU) corresponding to an upper limit of the data amount per one packet.

Subsequently, the video data packetized for each display area are delivered to corresponding rendering units RU1 to RU4 by using the video LAN 11 (step S3).

Then, it is determined whether or not the entire information to be expanded in the frame has been completely delivered (step S4). If not completely delivered, returning to the step S1, the processes following the step S1 are performed. If completely delivered, a display instruction timing stand-by state is entered as well as the subsequent video data are read (steps S5 and S6).

Then, at the display timing, the display instruction timing is generated (step S7). The display instruction packet responsive to the display instruction timing is delivered to all the rendering units RU1 to RU4 through the playback control LAN 12 by using a broadcast (or a multicast) (step S8). If the display instruction packet is delivered to all the rendering units RU1 to RU4, although not shown in FIG. 3, each rendering unit RU1 to RU4 outputs the video data corresponding to each responsible display area.

As such, the video data (or the video packets) are delivered to each rendering unit RU1 to RU4 through the video LAN 11, and the display instruction packets corresponding to the playback control information are delivered to each rendering units RU1 to RU4 through the playback control LAN 12. Therefore, the video data and the playback control information are separately delivered through a different dedicated network.

As a result, in the video data, it is possible to use a network bandwidth at maximum and transmit the video data in high quality. Further, in the playback control information, it is possible to transmit the information through a dedicated network. Therefore, it is possible to deliver the video control information to the rendering unit without failure.

Since a high-speed and high-capacity network is adopted as the video network, it is possible to deliver a large amount of video data without deterioration in quality. Since a low-capacity and low-speed network in comparison with the video LAN 11 may be adopted in the playback control LAN 12, it is possible to use a low-cost network.

Figure 4:
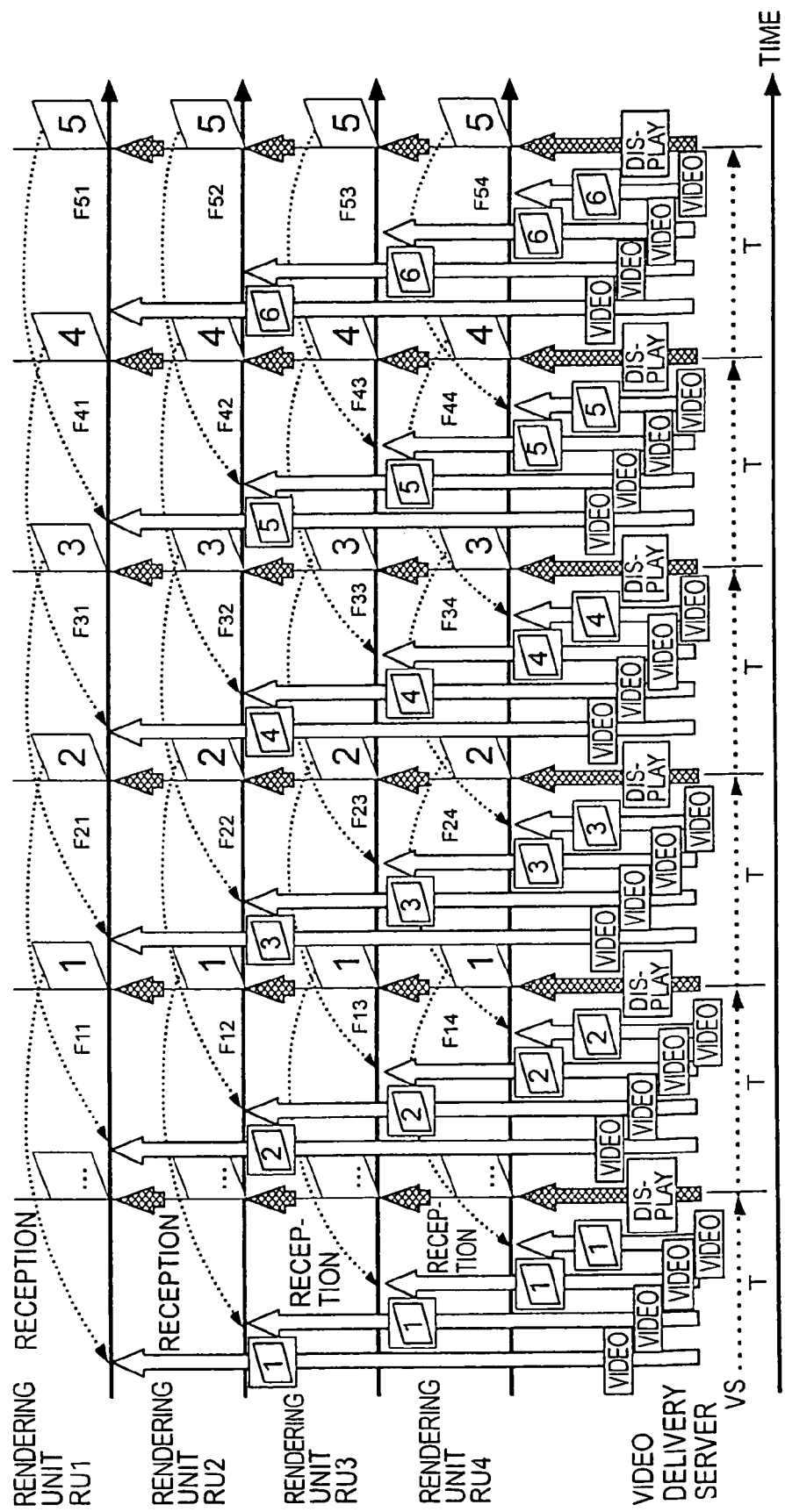
FIG. 4 is a schematic illustrating delivery timings of video packets and display instructing packets to rendering units from the video-data and playback-control-information delivery device (video delivery server) and operation of the rendering units at the time of normal playback by the multi-screen video playback apparatus according to the first exemplary embodiment.

FIG. 4 illustrates delivery timings for the video packets and the display instruction packets from the video delivery server VS to each rendering unit RU1 to RU4, and operations of each rendering unit RU1 to RU4, where the delivery timing for the video packet is shown as a white arrow, and the delivery timing for the display instruction packet is shown as a gray arrow. Also, FIG. 4 illustrates operations in a normal playback mode.

In FIG. 4, the "video" corresponding to the white arrow is an abbreviation of "video packet", and also represents that the white arrow indicates a timing of delivering the video packet. Similarly, the "display" corresponding to the gray arrow is an abbreviation of "display instruction packet", and also represents that the gray arrow indicates a timing of delivering the display instruction packet.

According to the first exemplary embodiment, as described above, the video packets storing the video data corresponding to each rendering unit are delivered from the video deliver server VS to each rendering unit RU1 to RU4 through the video LAN 11. As a result, each rendering unit RU1 to RU4 receives the video data stored in the video packets delivered to itself at the video data receiver 121 and then expnads them in the frame buffer 124.

Subsequently, the video deliver server VS delivers the display instruction packets to each rendering unit RU1 to RU4 through the playback control LAN 12 by using a broadcast at predetermined timings. As a result, each rendering unit RU1 to RU4 receives the delivered display instruction packets by the playback-control-information receiver 126, and outputs the video data that are being expanded to the frame buffer 124 to corresponding display units D1 to D4 by means of control of the output controller 123.

By repeating the above processes, each rendering unit RU1 to RU4 can output synchronized video data to each display unit D1 to D4. In addition, although it can not be said that the video corresponding to one frame is delivered by only one packet from the video delivery server VS, FIG. 4 is illustrated assuming that one frame is delivered by one packet for a convenient description.

Although the first exemplary embodiment described above relates to a normal playback mode, exemplary aspects of the present invention may be embodied by using an irregular playback mode, such as a variable-speed playback, a frame-advance playback, and a reverse playback. Now, as an irregular playback mode, a playback control to implement a variable-speed playback will be described.

The irregular playback control information to implement such a variable-spped playback is generated by the irregular playback-control-information generator 115. Specifically, when a variable-speed playback instruction, such as a high-speed playback or a low-speed playback, is issued to the irregular playback-instruction receiver 114, the irregular playback-control-information generator 115 generates irregular playback-control information corresponding to the variable-speed playback instruction issued by a user.

Then, the generated irregular playback-control information is given to the timing information generator 111 in this exemplary embodiment, and display instruction packets based on the irregular playback-control information are generated by the timing information generator 111, and the display instruction packets are output from the playback control information transmitter 102 to the playback control LAN 12. As a result, the display instruction packets are delivered to each rendering unit RU1 to RU4, and each rendering unit RU1 to RU4 outputs the video data to a corresponding display unit at timings based on the display instruction packets which have been delivered.

The timing information generator 111 generates the display instruction packets having a shorter delivery interval than that of the normal operation mode when the irregular playback control information indicates a fast instruction, and generates the display instruction packets having a longer delivery interval than that of the normal operation mode when the irregular playback control information indicates a low-speed playback instruction.

Figure 5:
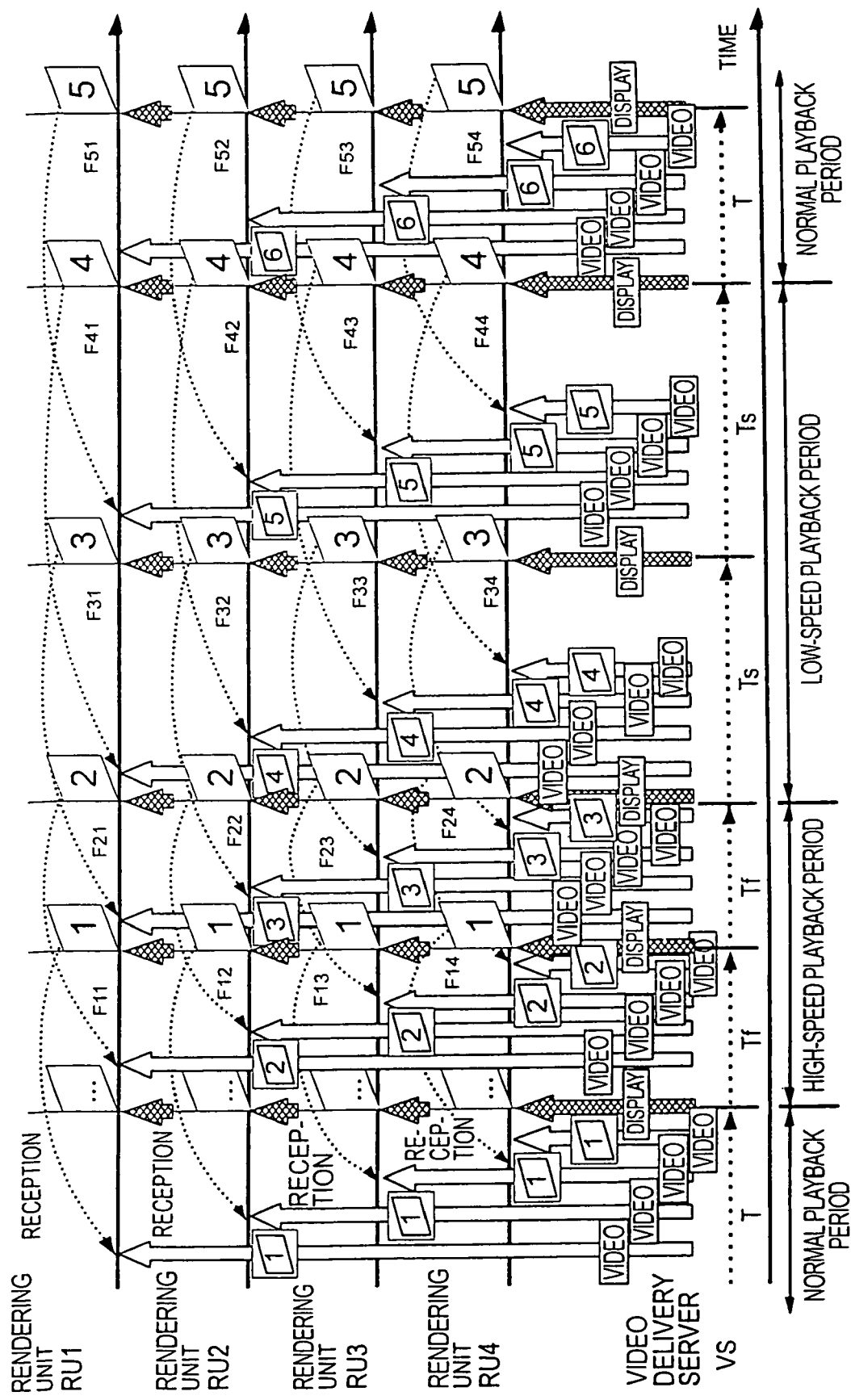
FIG. 5 is a schematic illustrating delivery timings of video packets and display instructing packets to rendering units from the video-data and playback-control-information delivery device (video delivery server) and operation of the rendering units at the time of variable-speed playback by the multi-screen video playback apparatus according to the first exemplary embodiment.

FIG. 5 illustrates video packets in a video delivery server VS and delivery timings of display instruction packets for each rendering unit RU1 to RU4 when a variable-speed playback (including a high-speed playback and a low-speed playback) is implemented.

As recognized in FIG. 5, while the delivery timings of the video packets are similar to those of the normal playback period, the delivery timings of the display instruction packets are different in a normal playback period, a high-speed playback period, and a low-speed playback period.

Specifically, in FIG. 5, during a hish-speed playback period, the display instruction packets are delivered to each rendering unit RU1 to RU4 with an interval Tf shorter than the normal playback display interval T (where, Tf<T) through a playback control LAN 12 by using a broadcast. In comparison, during a low-speed playback period, the display instruction packets are delivered to each rendering unit RU1 to RU4 with an interval Ts longer than the normal playback display interval T (where, Ts>T) through a playback control LAN 12 by using a broadcast.

As a result, in the exemplary embodiment shown in FIG. 5, during the normal playback period, each rendering unit RU1 to RU4 outputs the video data expanded in the frame buffer 124 to corresponding display units D1 to D4 by the display instruction packets delivered from the video delivery server VS in every normal playback display interval T. During the subsequent high-speed playback period, each rendering unit RU1 to RU4 outputs the video data expanded in the frame buffer 124 to corresponding display units D1 to D4 by the display instruction packets delivered in every interval Tf.

During the low-speed playback period, the video data expanded in the frame buffer 124 are output to the corresponding display units D1 to D4 by the display instruction packets delivered in every interval Ts. By repeating the operations described above, it is possible to implement a variable-speed playback mode including a high-speed playback or a low-speed playback.

As an example of another irregular playback other than the variable-speed playback in which the playback speed is changed, a frame-advance playback or a reverse playback may be embodied.

In order to implement a frame-advance playback, the delivery intervals of the video packets and the display instruction packets delivered from the video delivery server VS to each rendering unit RU1 to RU4 may be similar to the normal playback display interval T. However, during the frame-advance playback interval, the video data stored in the video packets may be the video data set by removing several frames.

Even when the frame-advance playback is performed, the variable-speed playback can be performed. Such an example can be embodied by changing the delivery interval of the display instruction packets as shown in FIG. 5.

Further, in order to implement a reverse playback, while the delivery intervals of the display instruction packets and the video packets delivered from the video delivery server VS to each rendering unit RU1 to RU4 are set to the normal playback display interval T, the video data to be delivered may be delivered in a reverse playback sequence. Specifically, while the video data are delivered in an ascending frame number sequence during the normal playback period, the video data are delivered in a descending frame number sequence during the reverse playback period.

In addition, even when the reverse playback is performed, the variable-speed playback may be performed. As described in connection with FIG. 5, such an example can be embodied by changing the delivery interval of the display instruction packets.

According to the first exemplary embodiment, the video data to be displayed in each rendering unit RU1 to RU4 are separately delivered to each rendering unit RU1 to RU4. However, the present invention is not limited thereto, but may be embodied even when the same video data are delivered from the video delivery server VS to all rendering units RU1 to RU4 by using a broadcast (or a multicast).

As described above, according to the first exemplary embodiment, the video delivery server VS as video-data and playback-control-information delivery device also functions as a playback-control-information delivery server. Specifically, the video delivery server VS has a function of delivering video data to each rendering unit RU1 to RU4 and also another function of generating playback control information for each rendering unit RU1 to RU4 and delivering them.

The video data (i.e., video packets) and the playback control information (i.e., display instruction packets in this embodiment) are delivered to the rendering units RU1 to RU4 through different networks, i.e., through the video LAN 11 for the video data and the playback control LAN 12 for the display instruction packets.

Further, since the video data has a large amount of data and requires a high-quality communication, a high-quality and high-speed network is adopted for the video LAN 11. A low-speed network may be adopted for the playback control LAN 12 to transmit the display instruction packets because the amount of the display instruction packets is smaller than that of the video data.

As described above, since the video data (video packets) and the playback control information are delivered to each rendering unit through each dedicated network, for the video data, the bandwidth of the network can be utilized at maximum, and high-quality video data can be transmitted. Further, for the playback control information, since a transmission can be made through a dedicated network, it is possible to reliably deliver the playback control information to each rendering unit.

Further, although the playback control information according to the first exemplary embodiment is to control the display timings by the display instruction packets, a playback control using commands other than the control of the display timings can be also made.

Further, since a general purpose network, TCP/EP, is used as a network protocol, commands for the playback control can be freely changed. As a result, flexibility in protocol development can be increased, and the number of playback control types can be advantageously updated later.

Second Exemplary Embodiment

In the above description for the first exemplary embodiment, the video delivery server VS used as a video-data and playback-control-information delivery device also functions as a playback-control-information delivery server. However, the video delivery server VS used as a video-data and playback-control-information delivery device and the playback control information delivery server may be separately configured in different structures. In addition, for the playback control information delivery server, since each exemplary embodiment of the present invention describes that the playback control information usually contains display timings, hereinafter, the playback-control-information delivery server is referred to as a timing server TS.

Figure 6:
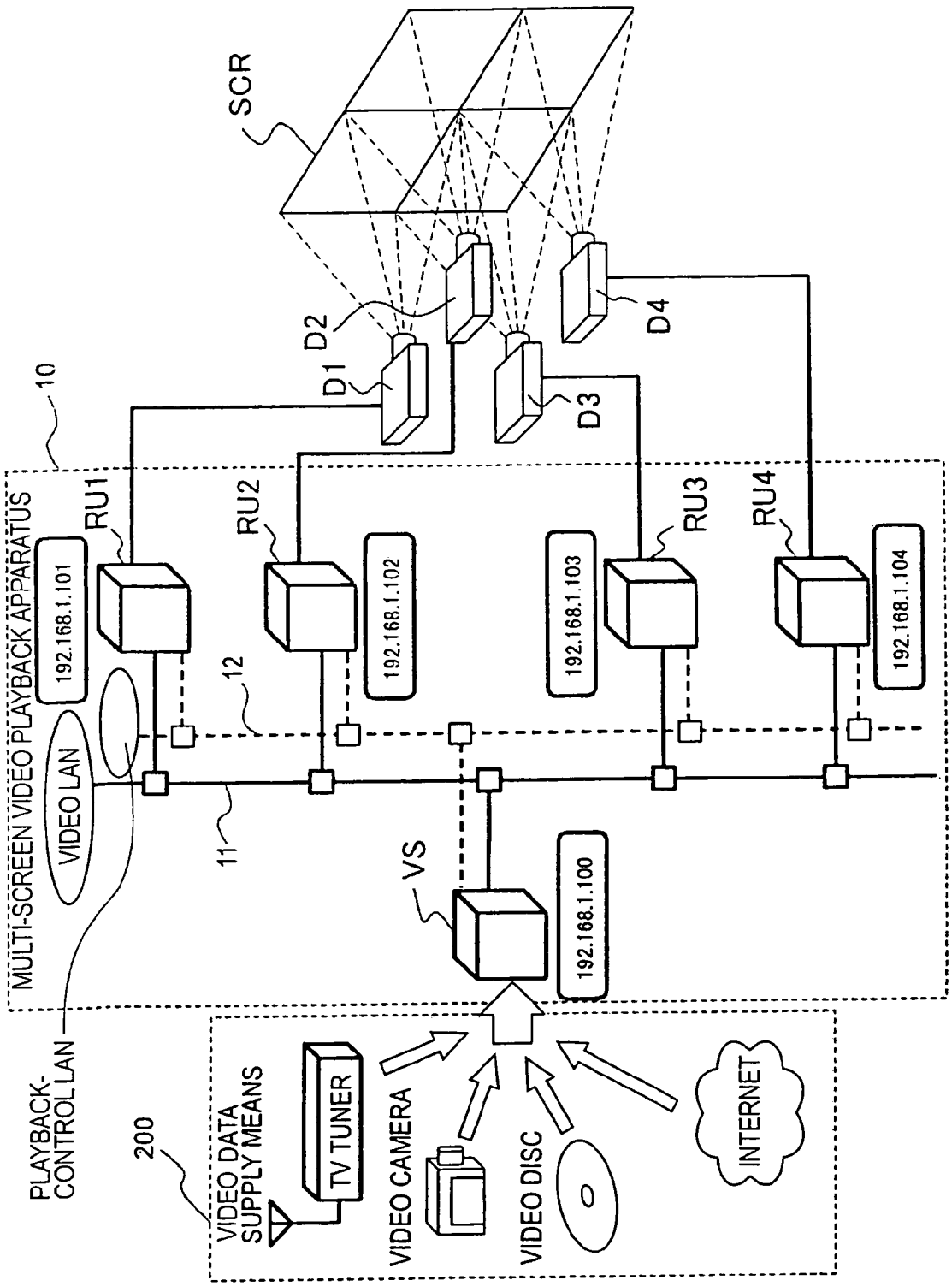
FIG. 6 is a schematic illustrating a structure of a multi-screen video playback apparatus according to a second exemplary embodiment.

FIG. 6 illustrates a multi-screen video playback apparatus 10 according to the second exemplary embodiment of the present invention. The configuration of FIG. 6 is similar to that of FIG. 1, except that the video-data and playback-control-information delivery device in FIG. 6 includes a video delivery server VS and a timing server TS prepared separately from the video delivery server VS, wherein the same elements are denoted by the same reference numerals.

According to the second exemplary embodiment, the video delivery server VS is connected to the video LAN 11 through a network interface (not shown), and the timing server TS is connected with a playback control LAN 12 through a network interface (not shown).

Figure 7:
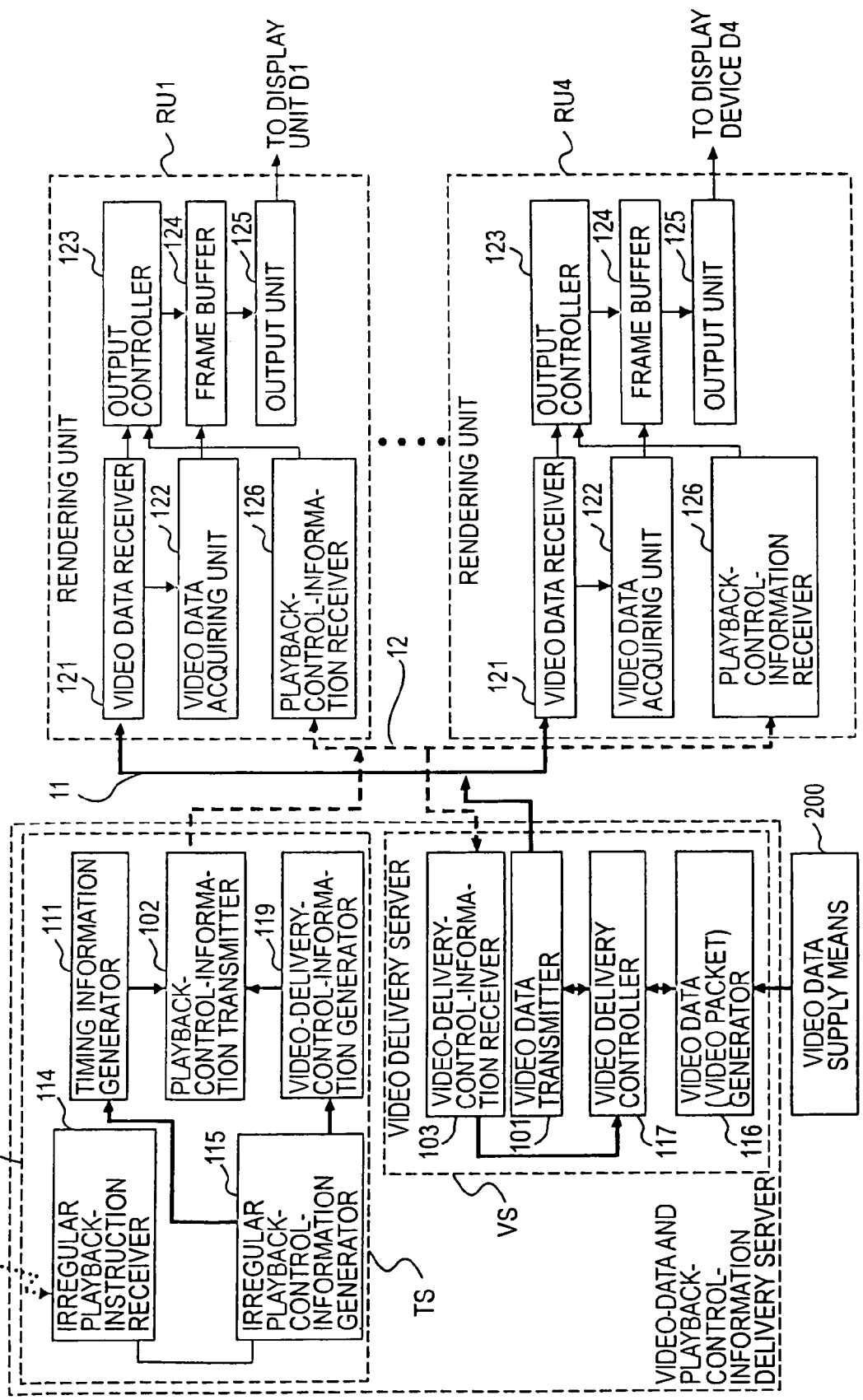
FIG. 7 is a schematic illustrating structures of a video-data and playback-control-information delivery device (a video delivery server and a timing server) and rendering units of the multi-screen video playback apparatus according to the second exemplary embodiment.

FIG. 7 illustrates configuration of the video delivery server VS, the timing server TS, and the rendering units RU1 to RU4 of FIG. 6. In addition, configuration of the rendering units RU1 to RU4 is similar to that of FIG. 2.

The timing server TS includes a timing information generator 111 which generates display instruction timing information as display packets, a video-delivery-control-information generator 119 which generates video delivery control information for the video delivery server VS as video delivery control packets, a playback-control-information transmitter 102 which delivers the video delivery control packets generated in the video-delivery-control-information generator 119 to the video delivery server VS through the playback control LAN 12 and delivers the display instruction packets generated in the timing information generator 111 to each rendering unit RU1 to RU4 through the playback control LAN 12 by using a point-to-multipoint communication, an irregular playback-instruction receiver 114 which receives the irregular playback instruction issued from a user, and an irregular playback-information generator 115 which issues the irregular playback-control information to one of the timing information generator 111 and the video delivery control information generator 119 or both of them based on the irregular playback instruction issued from a used and received by the irregular playback-instruction receiver 114.

In addition to the video data (video packets) generator 116 shown in FIG. 2, the video delivery server VS according to the second exemplary embodiment includes an video-delivery-control-information receiver 103 which receives the video deliver control packets generated by the video-delivery-control-information generator 119 of the timing server TS through the playback control LAN 12, a video delivery controller 117 which controls the video delivery to the rendering units RU1 to RU4 based on the video delivery control packets received in the video-delivery-control-information receiver 103, and an video data transmitter 101 which transmits the video packets generated in the video data (video packets) generator 116 through the video LAN 11.

Operations according to the second exemplary embodiment in which a video delivery server VS as a video-data and playback-control-information delivery device and a timing server TS are separately provided will now be described.

Figure 8:
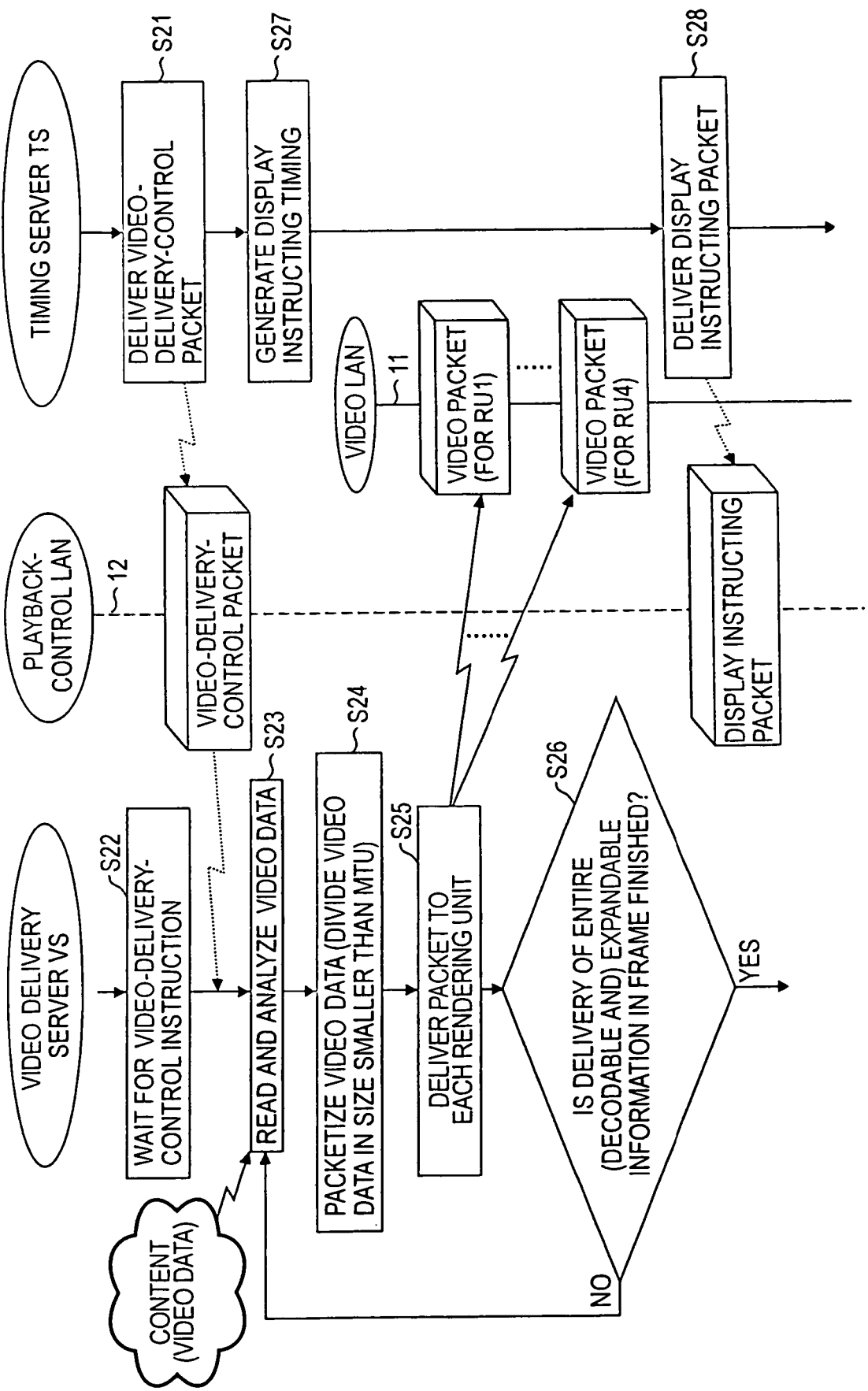
FIG. 8 is a flowchart illustrating operation of the video-data and playback-control-information delivery device (the video delivery server and the timing server) shown in FIG. 7.

FIG. 8 illustrates a process flow in a normal playback mode for the video delivery server VS and the timing server according to the second exemplary embodiment. Similar to the first exemplary embodiment, an example that the video data to be delivered to each rendering unit RU1 to RU4 are separately delivered to each rendering unit RU1 to RU4 will be described.

First, the timing server TS delivers the video delivery control packets to the video delivery server VS (step S21). The video deliver server VS reads and analyzes the contents (video data) when the video deliver control packets are received (step S23) in the video delivery control information stand-by state (step S22), generates the video data corresponding to the display area in which read and analyzed video data are displayed by each rendering unit RU1 to RU4, and packetizes the generated video data corresponding to each display area (step S24).

Further, the step S24 may include an encryption/re-encoding process in which the video data read and analyzed in the step S23 are decrypted and divided into each display area corresponding to each rendering unit RU1 to RU4, and the video data for each divided display area are re-encoded and packetized, or a process of reducing the size of the read and analyzed video data below a maximum transmission unit (MTU) corresponding to an upper limit of the data amount per one packet.

Subsequently, the packetized video data (video packets) are delivered to corresponding rendering units RU1 to RU4 through an video LAN 11 by using a unicast (step S25). In addition, it is determined whether or not the entire information which can be expanded in the frame has been completely delivered (step S26). If the entire information has not been completely delivered, the step S23 is returned.

The timing server TS generates display instruction timings (step S27) after delivering the video deliver control packets, and then delivers display instruction packets based on the generated display instruction timings at predetermined timings by using a point-to-multipoint communication (step S28). The display instruction packets are delivered to each rendering unit RU1 to RU4 through the playback control LAN 12.

If the display instruction packets are delivered to entire rendering units RU1 to RU4, although not shown in FIG. 8, each rendering unit RU1 to RU4 outputs the video data (expanded in a frame buffer 124) corresponding to each responsive display area. Then, the above processes are repeated.

Figure 9:
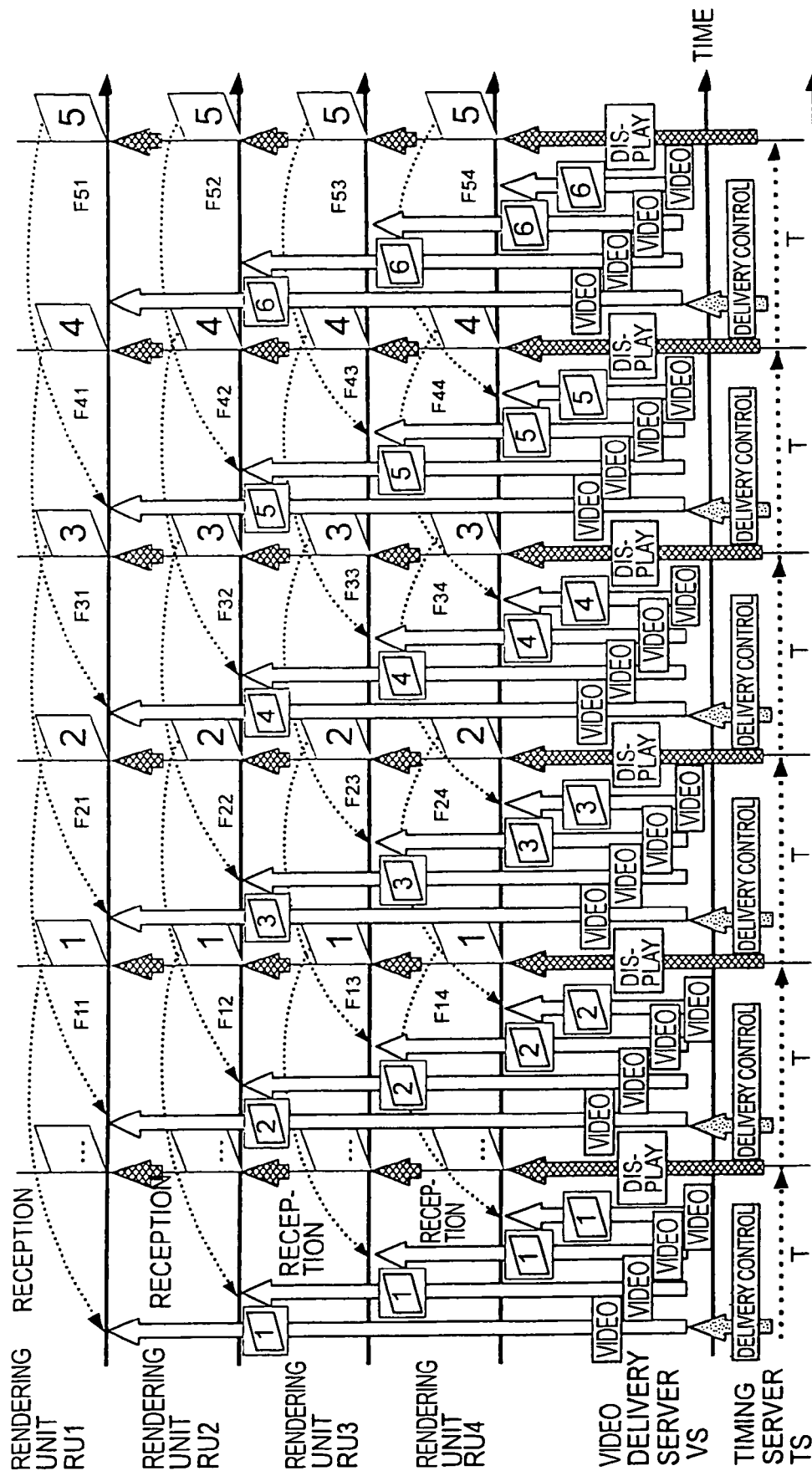
FIG. 9 is a schematic illustrating delivery timings of video packets and display instructing packets to rendering units from the video-data and playback-control-information delivery device (video delivery server) and operation of the rendering units at the time of normal playback by the multi-screen video playback apparatus according to the second exemplary embodiment.

FIG. 9 illustrates a timing of delivering the video delivery control packets from the timing server TS to the video delivery server VS, a timing of delivering the video packets generated by the video delivery control packets from the video deliver server VS to each rendering unit RU1 to RU4, a timing of delivering the display instruction packets from the timing server TS to the rendering units RU1 to RU4, and operations of each rendering unit RU1 to RU4 based on the video packets from the video delivery server VS and the display instruction packets from the timing server TS. FIG. 9 relates to operations of a normal playback mode.

In FIG. 9, while a timing of delivering the video delivery control packets from the timing server TS to the video delivery server VS is shown as a hatched arrow, a timing of delivering the video packets from the video deliver server VS to each rendering unit RU1 to RU4 is shown as a white arrow. Further, a timing of delivering the display instruction packets from the timing server TS to each rendering unit RU1 to RU4 is shown as a gray arrow.

In FIG. 9, the "video" corresponding to the white arrow is an abbreviation of "video packet", and also represents that the white arrow indicates a timing of delivering the video packet. Similarly, the "display" corresponding to the gray arrow is an abbreviation of "display instruction packet", and also represents that the gray arrow indicates a timing of delivering the display instruction packet. Similarly, the "delivery control" corresponding to the hatched arrow is an abbreviation of "video delivery control packet", and represents that the hatched arrow indicates a timing of delivering the video delivery control packet.

Operations of FIG. 9 are nearly similar to those of FIG. 4 showing the first exemplary embodiment. However, in FIG. 9, the video packets corresponding to each rendering unit RU1 to RU4 are delivered from the video deliver server VS based on the video delivery control packets from the timing server TS to the video delivery server VS. Also, the display instruction packets (shown as a gray arrow) are output from the timing server TS to each rendering unit RU1 to RU4. Since other operations are similar to those of FIG. 4, descriptions thereof will be omitted.

Further, since the video delivery control for the video delivery server VS from the timing server TS is also a playback control operation, the video delivery control packets are also delivered through the playback control LAN 12. The delivery of the video data corresponding to each rendering unit RU1 to RU4 from the video delivery server VS is performed by the video LAN 11.

In the second exemplary embodiment, an irregular playback, such as the variable-speed playback (including the high-speed playback and the low-speed playback) similar to the first exemplary embodiment, can be embodied. Specifically, the variable-speed playback, such as the low-speed playback, can be implemented by changing the interval of the display instruction timing from the timing server TS.

As another irregular playback other than the variable-speed playback, for example, a frame-advance playback or a reverse playback can be implemented by selecting the video delivery control information instructing extraction of the frames of the video data to be delivered or the video delivery control information instructing an ascending frame number sequence as the content of the video delivery control packet from the timing server TS to the video delivery server VS, as described in the first exemplary embodiment. Such irregular playback control operations are similar to the first exemplary embodiment, and thus their detailed descriptions will not be repeated.

According to the second exemplary embodiment, it is possible to implement an irregular playback control similar to the first exemplary embodiment. Furthermore, it is possible to reduce the processing load on the video delivery server VS by distributing part of the functions of the video delivery server VS described in the second exemplary embodiment to the timing server TS.

As in the first exemplary embodiment, the video data (i.e., video packets) and the playback control information (in the second exemplary embodiment, including the display instruction packets from the timing server to each rendering unit RU1 to RU4 and the video delivery control packets from the timing server TS to the video delivery server VS) are delivered through different dedicated networks.

Specifically, the video data are delivered through the video LAN 11 and the display instruction packets or the video delivery control packets are delivered through the playback control LAN 12 to the rendering units RU1 to RU4 or the video delivery server VS and, respectively.

Since the video data (i.e., video packets) and the playback control information are delivered through its own dedicated network, for the video data, it is possible to utilize the bandwidth of the network and also possible to transmit high quality video data. In addition, for the playback control information, since it is possible to use a dedicated network, the playback control information can be delivered to each rendering unit RU1 to RU4 or the video delivery server VS without failure.

As in the first exemplary embodiment, the second exemplary embodiment according to the present invention has been described by exemplifying a case that the video data to be displayed in each rendering unit RU1 to RU4 are separately delivered to each rendering unit RU1 to RU4, but not limited thereto. The second exemplary embodiment according to the present invention can be applied to a case that the same video data are delivered from the video delivery server VS to all the rendering units RU1 to RU4 by using a point-to-multipoint communication, such as a broadcast (or a multicast).

Third Exemplary Embodiment

In the first and second exemplary embodiments described above, the playback control information as well as the video data is delivered in one-way communication. Specifically, in the first exemplary embodiment, the playback control information is delivered from the video delivery server VS to each rendering unit RU1 to RU4 using a one-way communication. Also, in the second exemplary embodiment, the playback control information is delivered by using a one-way communication from the timing server TS to each rendering unit RU1 to RU4 or the video delivery server VS. However, in the third exemplary embodiment, the playback control information is delivered by using a two-way communication at least between the timing server TS and the rendering unit RU1 to RU4 or between the timing server TS and the video delivery server VS. In addition, the video data is delivered by using a one-way communication similar to the first exemplary embodiment.

Now, the two-way communication of the playback control information will be described by exemplifying the configuration of the second exemplary embodiment.

Figure 10:
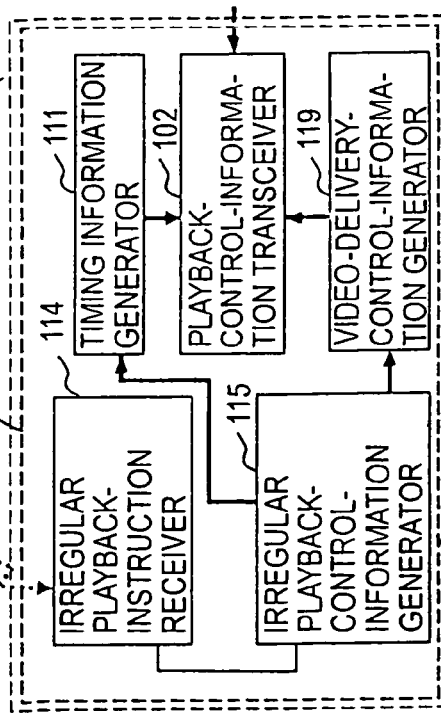
FIG. 10 is a schematic illustrating structures of a video-data and playback-control-information delivery device (a video delivery server and a timing server) and rendering units of the multi-screen video playback apparatus according to a third exemplary embodiment.

FIG. 10 is a schematic for describing configuration of a multi-screen video playback apparatus according to the third exemplary embodiment. FIG. 10 corresponds to FIG. 7 of the exemplary embodiment. A difference between FIGS. 7 and 10 is that a network capable of a two-way communication is connected between the timing server TS and the video delivery server VS and between the timing server TS and each rendering unit RU1 to RU4 in FIG. 10.

Other elements are similar to those of FIG. 7. Therefore, the same elements are denoted by the same reference numerals in FIGS. 7 and 10. However, since the playback control LAN 12 enables the two-way communication, the playback-control-information transmitter 102 of the timing server TS shown in FIG. 7 corresponds to the playback-control-information transceiver 105 in FIG. 10. The video-delivery-control-information receiver 103 of the video delivery server VS shown in FIG. 7 corresponds to the video-delivery-control-information transceiver 106 in FIG. 10. Also, the playback-control-information receiver 126 of the rendering units RU1 to RU4 shown in FIG. 7 corresponds to the playback-control-information transceiver 127 in FIG. 10.

Figure 11:
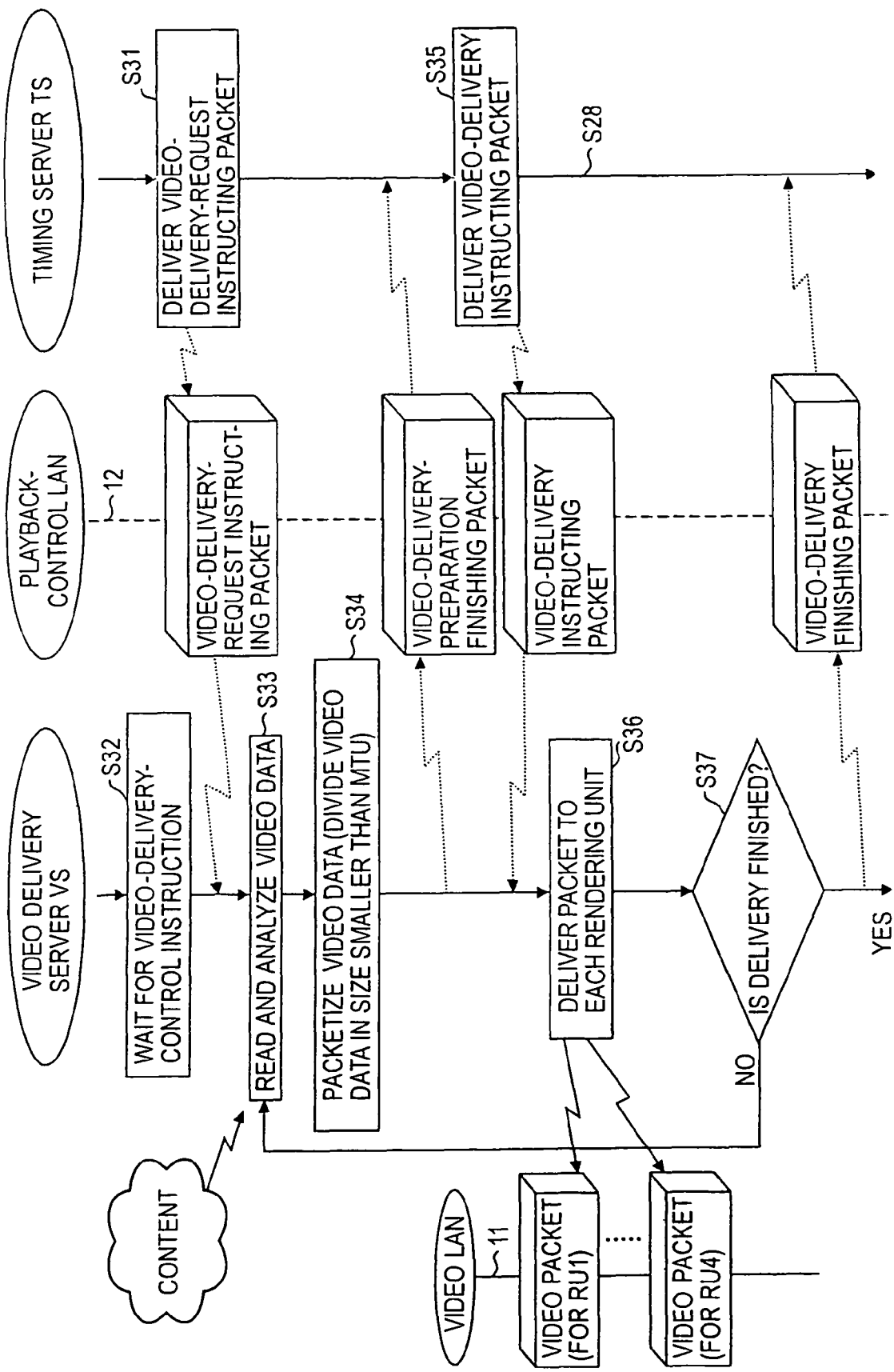
FIG. 11 is a flowchart illustrating an operational example of two-way communication between the video delivery server and the timing server which are shown in FIG. 10.

FIG. 11 illustrates a process flow in a normal playback mode for the video delivery server VS and the timing server TS according to the third exemplary embodiment. Similar to the aforementioned exemplary embodiments, an example that the video data to be delivered to each rendering unit RU1 to RU4 are separately delivered to each rendering unit RU1 to RU4 will be described.

First, the timing server TS delivers a video delivery request instruction packet to the video delivery server VS through the playback control LAN 12 (step S31). When the video delivery server VS receives the video delivery request instruction packet in the video delivery control information stand-by state (step S32), the contents (video data) are read and analyzed (step S33). Based on the read and analyzed video data, the video data corresponding to the display area onto which each rendering unit RU1 to RU4 should display are packetized (step S34).

The process of the step S34 may include an encryption/re-encoding process to decrypt the video data read and analyzed in the step S33, dividing them for display areas corresponding to each rendering unit RU1 to RU4, re-encoding the video data for each divided display area, and packetizing them, or a process of reducing the data size that have been read and analyzed to the data size below a maximum transmission unit (MTU) corresponding to an upper limit of the amount of information per one packet.

If the video data are completely packetized, a video delivery stand-by packet indicating that the video delivery has been prepared is delivered to the timing server TS through the playback control LAN 12.

When the timing server TS receives the video delivery stand-by packet from the video delivery server VS, the video delivery instruction packet instructing the delivery of the video data is transmitted to the video delivery server VS through the playback control LAN 12 (step S35).

When receiving the video delivery instructing packets from the timing server TS, the video delivery server VS delivers the video data (video packets) to the corresponding rendering units RU1 to RU4 through the video LAN 11 using a unicast (step S36).

Then, it is determined whether or not the entire information that can be expanded in the frame has been completely delivered (step S37). If the entire information has not been completely delivered, a return is made to S33. If the entire information has been completely delivered, a video delivery finishing packet indicating the finish of the video data delivery to the timing server TS through the playback control LAN 12.

In this way when the delivery of the video packets to the rendering units RU1 to RU4 from the video delivery server and the video delivery finishing packet is transmitted to the timing server TS through the playback control LAN 12, the communication between the timing server TS and the respective rendering units RU1 to RU4 is performed in turn. The communication between the timing server TS and the respective rendering units RU1 to RU4 will be described with reference to FIG. 12.

Figure 12:
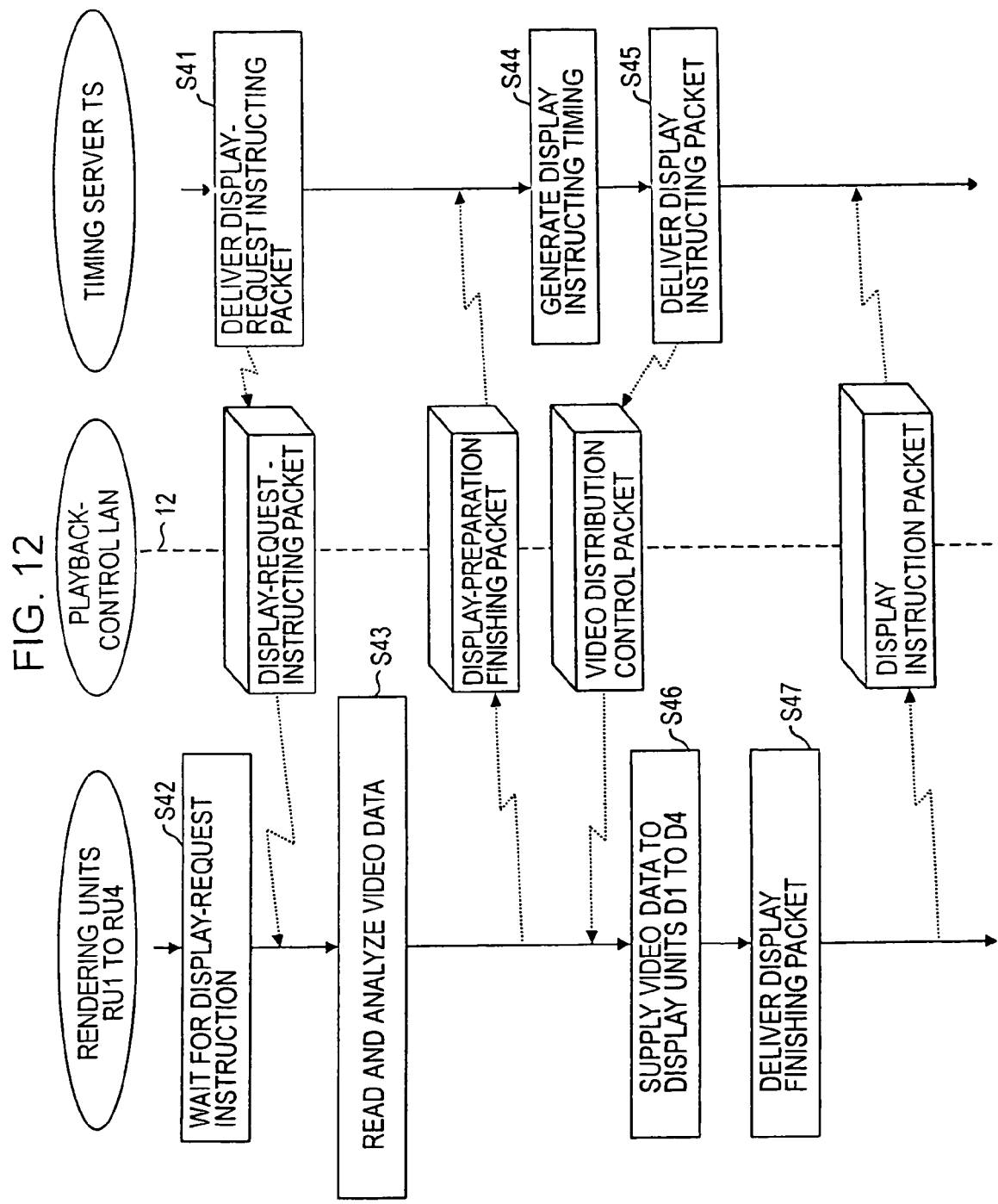
FIG. 12 is a flowchart illustrating an operational example of two-way communication between the timing server and the respective rendering units which are shown in FIG. 10.

When the timing server TS receives the video delivery finishing packet from the video delivery server VS, as shown in FIG. 12, the timing server TS delivers a display request instructing packet to the rendering units RU1 to RU4 through the playback control LAN 12 (step S41).

When receiving the display request instructing packet from the timing server TS in waiting for the display request instruction (step S42), the respective rendering units RU1 to RU4 read and analyze video data to be displayed from the frame buffer 124 (step S43), and transmit a display preparation finishing packet indicating finish of display preparation to the timing server TS through the playback control LAN 12.

As a result, the timing server TS generates a display instructing timing (step S44) and delivers the display instructing packet based on the generated display instructing timing to the respective rendering units through the playback control LAN 12 using a broadcast (step S45).

When the display instructing packet is delivered to all the rendering units RU1 to RU4, the respective rendering units RU1 to RU4 output the video data (video data expanded in the frame buffer 124) of the corresponding display areas to the corresponding display units D1 to D4 (step S46). Then, the rendering units deliver a display finishing packet indicating the finish of display to the timing server TS through the playback control LAN 12 (step S47). The aforementioned steps are repeatedly performed.

As described in the third exemplary embodiment, by enabling the two-way communication of the playback control information, the timing server TS and the video delivery server VS, and the timing server TS and the respective rendering units RU1 to RU4 can perform the communication with mutual cooperation, so that it is possible to more reliably perform the playback control. For example, when information is transmitted and received between the timing server TS and the rendering units RU1 to RU4 and the rendering units RU1 to RU4 do not perform the processes thereof in time, such a situation can be informed to the timing server TS, thereby always performing the playback control in a proper state. By performing the playback control, it is possible to more suitably and reliably deliver the video data and to allow the rendering units RU1 to RU4 to suitably display the delivered video data.

Although it has been described in the third exemplary embodiment that the case with the structure of the second exemplary embodiment is exemplified, it is possible, of course, to use the two-way communication network as the network to deliver the playback control information. When a certain playback control information exists between the video delivery server VS and the rendering units RU1 to RU4, the two-way communication of the playback control information can be performed between the video delivery server VS and the respective rendering units RU1 to RU4.

Although the present invention has been described with reference to the aforementioned exemplary embodiments, the present invention is not limited to the aforementioned exemplary embodiments, and may be modified in various forms without changing the gist thereof for example, the following modifications may be made.

(1) In the first exemplary embodiment, the display timing indicating the timing to display contents (video data) in the respective rendering units has been exemplified as the playback control information and in the second exemplary embodiment, the video delivery control information to the video deliver server from the timing server TS has been exemplified as the playback control information, in addition to the display timing. However, in addition to the aforementioned information, a variety of information may be considered as the playback control information.

For example, by giving a certain playback control information (command) to a specific rendering unit from the video-data and playback-control-information delivery device, it is possible to perform the playback control allowing the specific rendering unit to perform display operation in accordance with the command.

In this way, when a playback control other than the playback control based on the display timing can be performed as the playback control to the respective rendering units RU1 to RU4, a certain playback control information to perform the playback control other than the playback control based on the display timing may be transmitted through the playback control LAN 12, a display synchronization LAN may be provided as a network dedicated to the display timing synchronizing the display, and the display timing (display instructing packet) may delivered through the display synchronization LAN.

According to such a structure, since a variety of playback control can be performed and the network dedicated to the display timing is provided, it is possible to more reliably take synchronism in a system in which a plurality of display devices constituting a multi-screen video apparatus perform an video display in synchronism with one another.

(2) In the multi-screen video playback apparatus according to the aforementioned exemplary embodiments, the respective rendering units have been separated from the respective display units. However, exemplary aspects of the present invention may have a structure that the respective rendering units are built in as constituent elements of the respective display units.

(3) In the aforementioned exemplary embodiments, the video delivery server VS, the timing server TS, and the rendering units RU1 to RU4 have been provided as separate hardware, but the units may form a body. In order to embody an exemplary aspect of the present invention using only a display unit (for example, projectors), the video delivery server VS, the timing server TS, and the rendering units RU1 to RU4 may be all built in the display unit, and a variety of aspects thereof may be considered.

(4) In the multi-screen video playback apparatus according to the aforementioned exemplary embodiments, the case where one large-sized video is played back by a large-size multi-screen display has been described. However, the present invention is not limited to the case, but may be applied to such a case that a plurality of display units constituting the multi-screen display independently plays back different independent videos.

(5) In the multi-screen video playback apparatus according to the aforementioned exemplary embodiments, it has been described that four projectors are arranged in a matrix shape of two rows and two columns. However, the kind, the number, the arrangement pattern, etc. are not limited to those of the embodiments.

In an exemplary aspect of the present invention, video playback programs for the multi-screen video playback apparatus in which the video playback procedures of the multi-screen video playback apparatus to embody the exemplary aspect of the present invention described above are described may be prepared and may be recorded in a recording medium, such as a floppy disk, an optical disk, a hard disk, etc. Therefore, exemplary aspects of the present invention includes the recording medium in which the video playback programs for the multi-screen video playback apparatus are recorded. The video playback programs for the multi-screen video playback apparatus may be acquired through a network.

What is claimed is:

1. A multi-screen video playback system for a multi-screen display, the multi-screen video playback system comprising:
a plurality of display units constituting the multi-screen display;
a local area network;
a plurality of rendering units which are connected to the local area network and output video data to the corresponding display units among the plurality of display units, the video data including frames of video data; and a video-data and playback-control-information delivery device which is connected to the local area network and has a function of delivering the video data to the plurality of rendering units and a function of delivering to the plurality of rendering units playback control information which enables the plurality of rendering units to output the video data to the corresponding display units, the local area network comprising:

a video network that connects the video-data and playback-control-information delivery device and each rendering unit, the video network configured to deliver the video data; and a playback-control-information network that connects the video-data and playback-control-information delivery device and each rendering unit, the playback-control-information network being separate from the video network and configured to deliver the playback control information, the playback control information including a synchronization signal which synchronizes the rendering units enabling the plurality of display units to display synchronized images, the synchronized images each being a partial picture corresponding to a dedicated area of the display with respect to the corresponding display units, the partial picture for each area corresponding to each imaging unit separately delivered.

2. The multi-screen video playback system according to claim 1, the playback-control-information network enabling two-way communication between the video-data and playback-control-information delivery device and the rendering units.

3. The multi-screen video playback system according to claim 1, the video-data and playback-control-information delivery device including a playback-control-information delivery server which can generate and deliver the playback control information, and a video delivery server which can generate video data to be supplied to the rendering units and deliver the video data to the rendering units.

4. The multi-screen video playback system according to claim 3, the playback-control-information network enabling at least connection between the playback-control-information delivery server and the video delivery server and between the playback-control-information delivery server and the rendering units.

5. The multi-screen video playback system according to claim 4, the playback-control-information network enabling at least two-way communication between the playback-control-information delivery server and the video delivery server and between the playback-control-information delivery server and the rendering units.

6. The multi-screen video playback system according to claim 1, the video network being a large-capacity and high-speed network and the playback-control-information network being a small-capacity and low-speed network compared with the video network.

7. A video playback method in a multi-screen video playback system for a multi-screen display, the multi-screen video playback system including:

a plurality of display units constituting the multi-screen display;

a local area network including a video network and a playback-control-information network which is separate from the video network;

a plurality of rendering units which is connected to the local area network and outputs video data to the corresponding display units among the plurality of display units; and video-data and playback-control-information delivery means which is connected to the network and has a function of delivering the video data to the plurality of rendering units and a function of delivering playback control information to the plurality of rendering units which enables the plurality of rendering units to output the video data to the corresponding display units, the playback control information including a synchronization signal which synchronizes the rendering units enabling the plurality of display units to display synchronized images, the synchronized images each being a partial picture corresponding to a dedicated area of the display with respect to the corresponding display units, the partial picture for each area corresponding to each imaging unit separately delivered, the method comprising:

delivering the video data through the video network that connects the video-data and playback-control-information delivery means and each rendering unit, the video data including frames of video data; and delivering the playback control information through the playback-control-information network that connects the video-data and playback-control-information delivery means and each rendering unit.

8. A video-data and playback-control-information delivery device for a multi-screen display, the video-data and playback-control-information delivery device comprising:

a first delivery means which is connected to a video network and delivers video data to a plurality of rendering units, the video network connecting the first delivery means and each rendering unit, the video data including frames of video data; and a second delivery means which is connected to a playback-control-information network which is separate from the video network and connects the second delivery means and each rendering unit, the second delivering means delivering to the plurality of rendering units playback control information making the plurality of rendering units output the video data to corresponding display units, the playback control information including a synchronization signal which synchronizes the rendering units enabling the plurality of display units to display synchronized images, the synchronized images each being a partial picture corresponding to a dedicated area of the display with respect to the corresponding display units, the partial picture for each area corresponding to each imaging unit separately delivered.

9. A rendering unit which outputs video data to a corresponding display unit for multi-screen display, the rendering unit comprising:

a first receiving means which is connected to a video network and receives the video data, the video data including frames of video data;

a second receiving means which is connected to a playback control-information network which is separate from the video network and receives playback control information; and an output means which outputs the video data to the corresponding display unit based on the playback control information, the playback control information including a synchronization signal which synchronizes the rendering units enabling the plurality of display units to display synchronized images, the synchronized images each being a partial picture corresponding to a dedicated area of the display with respect to the corresponding display units, the partial picture for each area corresponding to each imaging unit separately delivered.

* * * * *